(12) United States Patent
Hunter

(10) Patent No.: US 7,036,863 B2
(45) Date of Patent: May 2, 2006

(54) RECREATION VEHICLE RAMP DOOR SPRING ARRANGEMENT

(75) Inventor: Randy Hunter, Pendleton, OR (US)

(73) Assignee: Fleetwood Enterprises, Inc., Riverside, CA (US)

( * ) Notice: Subject to any disclaimer, the term of this patent is extended or adjusted under 35 U.S.C. 154(b) by 64 days.

(21) Appl. No.: 10/909,952

(22) Filed: Jul. 30, 2004

(65) Prior Publication Data

US 2006/0022481 A1    Feb. 2, 2006

(51) Int. Cl.
B62D 25/00    (2006.01)
(52) U.S. Cl. ........................ 296/61; 296/57.1
(58) Field of Classification Search .............. 296/61, 296/57.1, 50, 146.9
See application file for complete search history.

(56) References Cited

U.S. PATENT DOCUMENTS

| | | | | | |
|---|---|---|---|---|---|
| 2,541,288 | A | * | 2/1951 | Rice ............................. | 296/61 |
| 2,653,845 | A | * | 9/1953 | Benjamin ...................... | 296/61 |
| 2,796,287 | A | | 6/1957 | Moyes | |
| 3,009,732 | A | | 11/1961 | Brown | |
| 3,193,321 | A | * | 7/1965 | Rose ............................. | 296/61 |
| 3,795,329 | A | * | 3/1974 | Martin et al. ................ | 414/545 |
| 3,902,613 | A | * | 9/1975 | Newland ..................... | 414/538 |
| 4,037,564 | A | * | 7/1977 | Schrock ........................ | 296/61 |
| 4,098,414 | A | | 7/1978 | Abiera | |
| 4,475,761 | A | * | 10/1984 | Milroy et al. ................. | 296/61 |
| 4,749,317 | A | * | 6/1988 | Daniel .......................... | 410/26 |
| 4,792,274 | A | * | 12/1988 | Cockram ....................... | 296/51 |
| 4,854,460 | A | * | 8/1989 | Josephs ....................... | 220/1.5 |
| 4,854,631 | A | * | 8/1989 | Laursen ....................... | 296/158 |
| 4,869,545 | A | * | 9/1989 | Notermann ................... | 296/157 |
| 4,966,510 | A | * | 10/1990 | Johnson, Jr. ................. | 410/26 |
| 5,314,200 | A | * | 5/1994 | Phillips ........................ | 296/61 |
| 5,761,849 | A | * | 6/1998 | Tokuno ......................... | 49/193 |
| 5,768,828 | A | * | 6/1998 | Wilson ......................... | 49/386 |
| 6,068,324 | A | * | 5/2000 | DeKlotz ....................... | 296/61 |
| 6,102,646 | A | * | 8/2000 | Bass et al. ................... | 296/61 |
| 6,135,532 | A | * | 10/2000 | Martin ......................... | 296/61 |
| 6,183,031 | B1 | * | 2/2001 | Ballard et al. ............. | 296/57.1 |
| 6,196,609 | B1 | | 3/2001 | Bowers | |
| 6,368,034 | B1 | * | 4/2002 | Frye ............................. | 410/26 |
| 6,378,927 | B1 | * | 4/2002 | Parry-Jones et al. .......... | 296/61 |
| 6,485,004 | B1 | * | 11/2002 | Licata et al. ................ | 296/57.1 |
| 6,616,396 | B1 | * | 9/2003 | Sternberg .................... | 414/538 |
| 6,688,414 | B1 | * | 2/2004 | Bruno .......................... | 180/233 |
| 6,722,726 | B1 | * | 4/2004 | Parmer ....................... | 296/157 |
| 6,817,653 | B1 | * | 11/2004 | Ropp ............................ | 296/21 |
| 6,820,920 | B1 | * | 11/2004 | Maeda ..................... | 296/146.8 |
| 2003/0044266 | A1 | * | 3/2003 | Vandillen et al. ........... | 414/537 |
| 2005/0214091 | A1 | * | 9/2005 | Daneshvar ................... | 410/13 |

\* cited by examiner

Primary Examiner—Kiran B. Patel

(57) ABSTRACT

An assembly comprising at least two structural members moveably coupled to each other, each structural member being coupled to opposite ends of a bias member biasing the at least two structural members to move towards or away from each other, wherein one or more of the at least two structural members form a bias member receiving recess and the structural members and bias member are coupled together in such a manner that moving one structural member relative to the other structural member causes the bias member to rotate at least partially into or at least partially out of the bias member receiving cavity.

14 Claims, 3 Drawing Sheets

RECREATION VEHICLE RAMP DOOR SPRING ARRANGEMENT

FIELD OF THE INVENTION

The present invention relates generally to ramp door spring assemblies, particularly such assemblies incorporated into recreation vehicles intended to carry other recreation vehicles.

BACKGROUND OF THE INVENTION

Recreation vehicles such as motorcycles, jet skis, ATVs (all terrain vehicles), race cars, sandrails, go-carts, boats are very popular. Most such vehicles are designed to be used in areas remote from where they are stored. As a result, it is quite common to load such vehicles on a trailer along with related supplies and equipment to get them to the area in which they are to be used. Some trailers used are dedicated to hauling recreation vehicles while others also provide living space at the destination.

When loading vehicles onto a trailer, it is sometimes convenient to utilize a ramp to get them into the vehicle. For recreation vehicle trailers, the ramp may also serve as a door to a large opening into the trailer such that the door is swung down to open it and use it as a ramp, and swung up and fastened in place to close off the opening in the trailer. In some instances it is beneficial to use a spring or other mechanism to help compensate for the weight of the ramp door and to make the ramp door easier to open and close.

SUMMARY OF THE INVENTION

The present invention is directed to an assembly comprising at least two structural members moveably coupled to each other, each structural member being coupled to opposite ends of a bias member biasing the at least two structural members to move towards or away from each other, wherein one or more of the at least two structural members form a bias member receiving recess and the structural members and bias member are coupled together in such a manner that moving one structural member relative to the other structural member causes the bias member to rotate at least partially into or at least partially out of the bias member receiving cavity.

In a preferred embodiment, the bias member is a spring extending between a ramp door and the side of an opening into a trailer, and the spring rotates into and out of a spring recess when the ramp door is opened and closed.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 1:
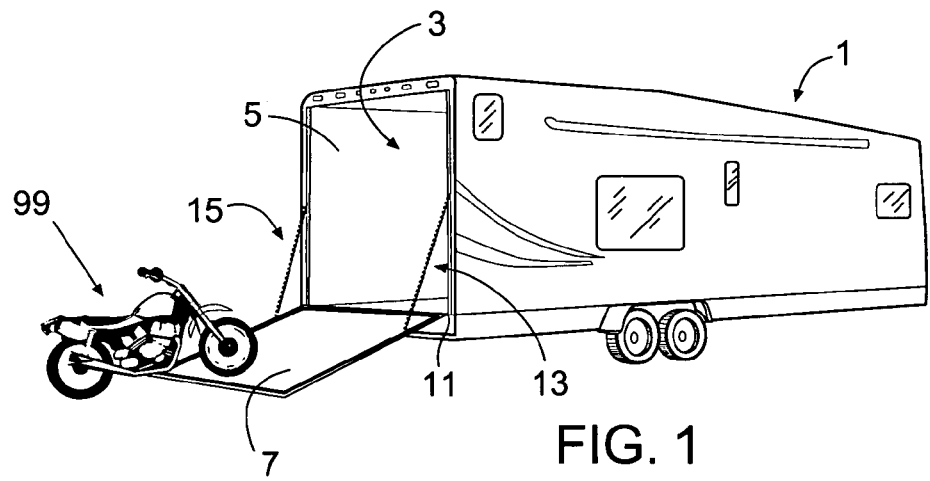
FIG. 1 is perspective view of a trailer and a recreation vehicle being unloaded from the trailer.

In FIG. 1, a trailer 1 and recreation vehicle 99 are shown where vehicle 99 is being unloaded from compartment 3 of trailer 1 through opening 5 via ramp door 7. Ramp door 7 is coupled to the rear end 9 of trailer 1 via hinge assembly 11, and spring assemblies 13 and 15. Ramp door 7 is sized and dimensioned to close off opening 5 when closed, and to function as a ramp for loading and unloading vehicle 99 from compartment 3 when open.

Figure 2:
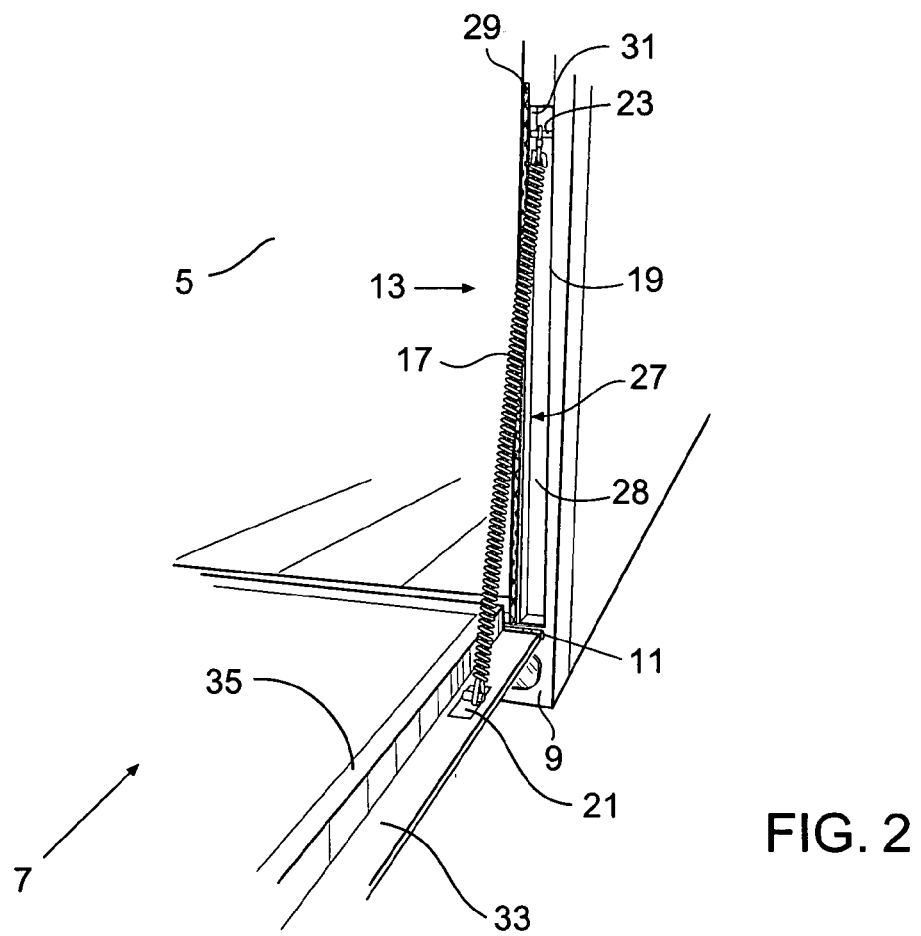
FIG. 2 is a perspective view of one of the ramp door spring assemblies of the trailer of FIG. 1.

FIG. 2 shows spring assembly 13 of FIG. 1. The components of the assembly 13 are mirrored in the assembly 15 so a separate illustration of assembly 15 is not provided. As shown, spring assembly 13 comprises a spring 17, a spring recess 19, and various mounting and guidance members. More particularly, spring 17 has a ramp door end coupled to bracket 21 (which is coupled to ramp door 7) and a trailer body end coupled to pin 23 (which is coupled to rear end 9 of trailer 1). Pin 23 is positioned within recess 19 and operates with sides 25 and 27 of recess 19 to position spring 17 when ramp door 7 is closed. Sides 25 and 27 function at least to: (a) provide support for pin 23 so that pin 23 can extend across the entire width of recess 19 while be spaced apart from back 28 of recess 19, (b) guide spring 17 into recess 19 as the ramp door 7 is closed, and, at least for side 27, to (c) provide a sealed barrier between compartment 3 and spring 17 and between compartment 3 and spring recess 19. Side 27 provides a sealed barrier, at least in part, by including sealer strip 29 which is compressed between the body 31 of side 27 and ramp door 7 when ramp door 7 is closed.

Figure 3:
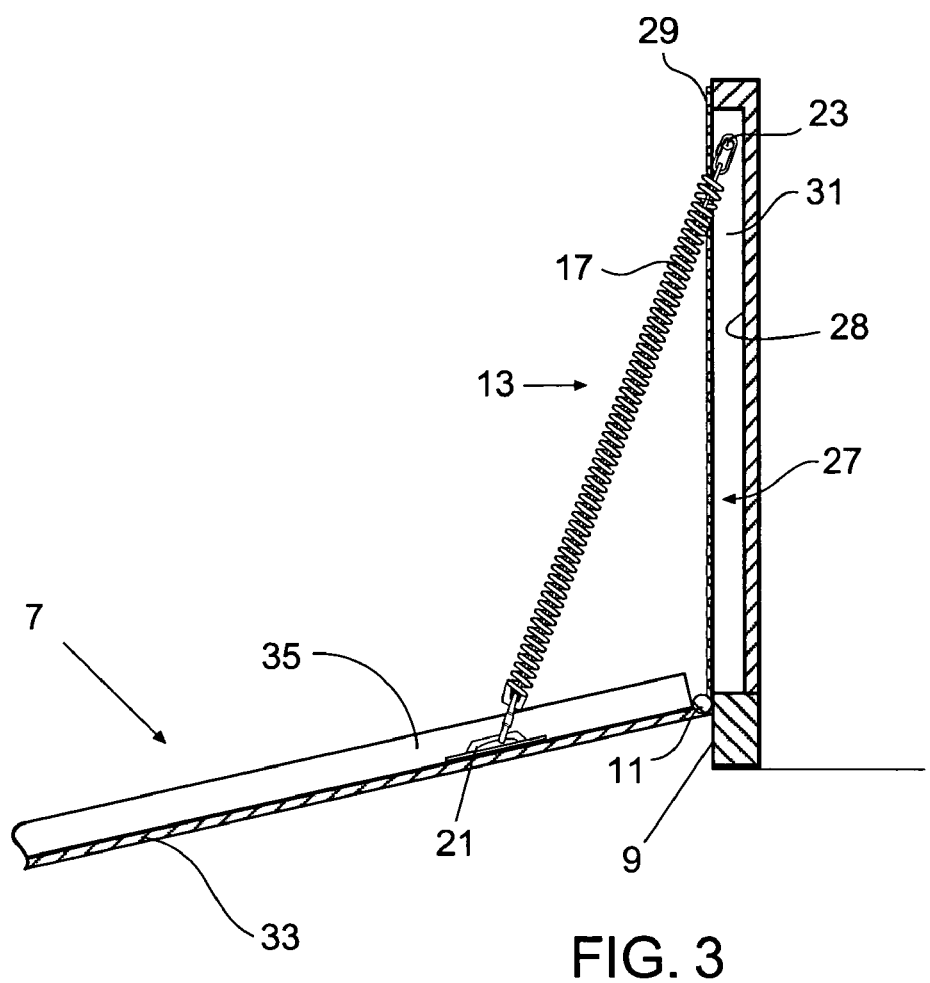
FIG. 3 is a cutaway side view of the spring assembly of FIG. 2 when the ramp door is open.

FIG. 3 is a cutaway side view of the spring assembly of FIG. 2 when the door is open. As can be seen, when open, spring 17 stretches between ramp door 7 and rear end 9 so as to bias ramp door 7 towards a closed position, i.e. to aid in pivoting ramp door 7 on hinge assembly 11 from its open/ramp position to its closed position. When open, ramp door 7 extends between the rear end 9 and the ground and functions as an inclined plane when loading and unloading trailer 1.

Figure 4:
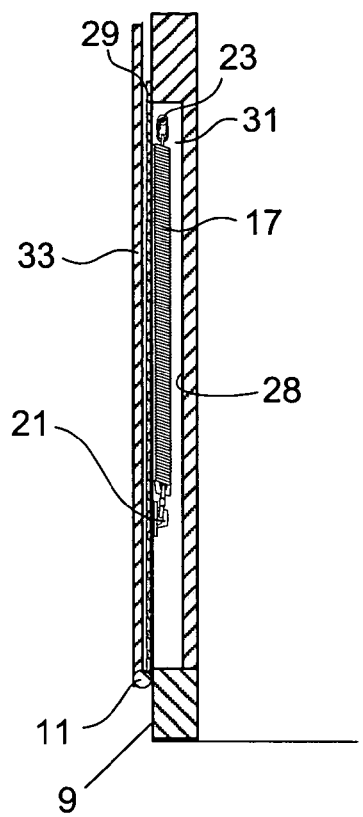
FIG. 4 is a cutaway side view of the spring assembly of FIG. 2 when the ramp door is closed.
Figure 5:
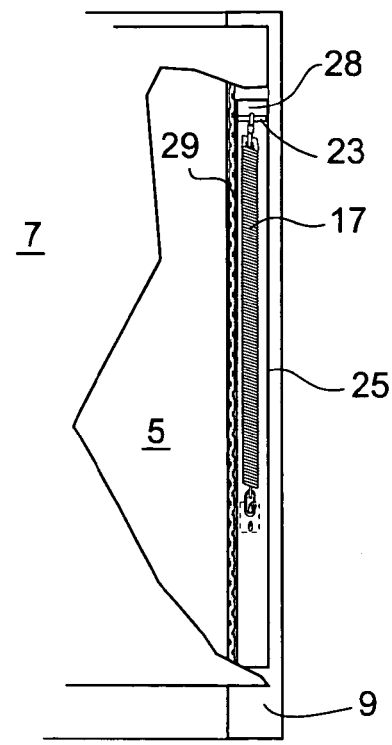
FIG. 5 is a cutaway back view of the spring assembly of FIG. 2 when the ramp door is closed.
Figure 6:
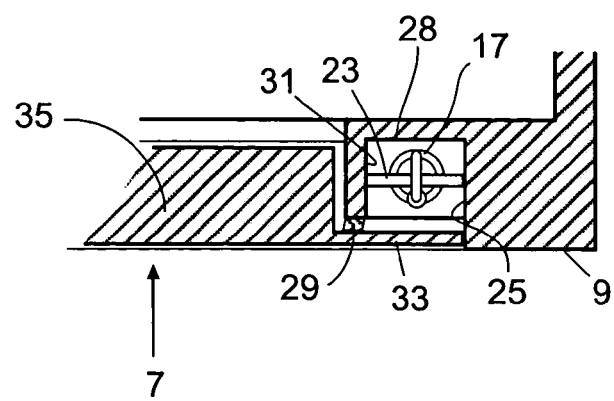
FIG. 6 is a cutaway top view of the spring assembly of FIG. 2 when the ramp door is closed.

FIGS. 4, 5, and 6 provide cutaway views of the spring assembly of FIG. 2 when the ramp door is closed When closed, ramp door 7 fully covers opening 5, bracket 21 and pin 23 are all positioned within recess 19, and strip 29 is compressed between body 31 of side 27 and ramp door 7.

As ramp door is 7 swung open, spring 17 is caused to both stretch and to rotate around pin 23, and in so doing, to rotate out of recess 19. When ramp door 7 is swung closed, spring 17 is compresses and rotates around pin 23 and back into recess 19 which receives both spring 17 and bracket 21.

Referring to pin 23, spring 17 is allowed to slide along pin 23 between sides 25 and 27. It is contemplated that mounting spring 17 in such a manner provides a number of benefits, both in regard to how the spring assembly is put together, and how forces are distributed between the various spring assembly components. Because of the manner in which spring 17 can move on pin 23, the positioning of pin 23 in recess 19, and the positioning of sides 25 and 27 relative to pin 23 and spring 17, sides 25 and 27 function to guide spring 17 into recess 19 as the ramp door 7 is closed.

Referring to FIG. 6, ramp door 7 also comprises cover flange 33 (and a corresponding flange that is not shown on the opposite side of ramp door 7) which acts as a cover for recess 19. when ramp door 7 is closed, sides 25 and 27, back 28, and cover flange 31 all act to prevent debris from entering recess 19 and/or contaminating spring 17. This is particularly beneficial when driving in unpaved areas as it helps to prevent any material kicked up by the tires or knocked down by the body of trailer 1 to foul spring 17. Similarly, the same members help prevent any oil or other material that might be dislodged from spring 17 from entering compartment 3.

It is contemplated that spring 17 and the spring of assembly 15 may be replaced by other bias members such as pistons, may bias ramp door 7 open rather than closed, and/or may utilize a bias mechanism that doesn't require that the member be stretched. As such, any reasonable bias member that functions to facilitate opening and/or closing of the ramp door may be used in place of spring 17 and/or the spring of assembly 15.

It is also contemplated that the assemblies described herein are applicable in other applications. Such applications include but are not limited to use on vehicles and/or other apparatus that are not recreation vehicles trailers, and/or to bias doors that are not ramp doors.

Unless explicitly limited herein, the various items described herein may comprise a single piece or an assembly of pieces, and each piece may comprise any material or combination of materials. Similarly, the various pieces may be sized, dimensioned, and positioned in any manner that does prevent them from functioning as required herein.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

An embodiment may in some instances be characterized as a recreation vehicle comprising a door ramp, a body, and a spring with the spring extending between the ramp door and the body and the door ramp coupled to the body in such a manner that the door ramp can be swung between at least an open position where the door extends between the body and a surface supporting the vehicle and a closed position where it does not so extend, wherein: the body comprises a spring receiving recess that the spring is positioned substantially within when the ramp door is closed. Such an embodiment may in some instances also be characterized as satisfying and/or including one or more of the following: (a) opening the door causes the spring to stretch and to rotate at least partially out of the spring receiving recess; (b) the spring is rotateably coupled to the body by a pin that extends between two sidewalls of the spring receiving recess, and the spring is coupled to the pin in such a manner that it can slide along the pin; (c) swinging the door ramp close causes the ramp to compress an elastomeric seal positioned adjacent to one of the two sidewalls of the spring receiving recess; (d) the spring is coupled to the ramp door by a bracket that is positioned within the spring receiving recess when the door is closed; (e) the recess comprises a top wall and a back wall wherein the top wall and back wall are substantially perpendicular to each other and both the top wall and back wall are positioned with X inches of the pin where X is one of 4, 3, 2, 1, and 0.5; and (f) the vehicle comprises at least a second spring and at least a second spring receiving cavity.

An embodiment may in some instances be characterized as a recreation vehicle ramp door spring arrangement comprising a trailer including: a floor, a ceiling, and two sides surrounding a cavity sized and dimensioned to hold at least one recreation vehicle; an opening extending from an exterior of the vehicle into the cavity with the opening sized and dimensioned such that a recreation vehicle can enter the cavity through the opening; a vehicle ramp structured and coupled to the trailer in such a manner that the ramp is pivotable between an open position and a closed position wherein the ramp blocks more of the opening when in the closed position than when in the open position and can support a vehicle as it is being moved into the trailer while in the open position; at least a first spring and a second spring positioned on opposite sides of the opening and extending between the sides of the opening and the vehicle ramp; and at least a first spring recess and a second spring recess with the first spring removeably coupled to the side of the opening via a first spring pin extending between two opposite sides of the first spring recess and the second spring removeably coupled to the side of the opening via a second spring pin extending between two opposite sides of the second spring recess; wherein pivoting the ramp into the open position causes the first spring to stretch and to rotate at least partially out of the first spring recess and causes the second spring to stretch and rotate at least partially out of the second spring recess; pivoting the ramp into the closed position r causes the first spring to rotate at least partially into the first spring recess and causes the second spring to rotate at least partially into the second spring recess; and pivoting the ramp into the closed position causes the ramp to compress at least two elastomeric seals where a first seal is positioned adjacent to the first spring recess and a second seal is positioned adjacent to the second spring recess and the first and second seals, when compressed between the ramp and the trailer each form a barrier inhibiting material from passing between the first and second spring recesses and the trailer cavity through the opening.

An embodiment may in some instances be characterized as an assembly comprising at least two structural members moveably coupled to each other, each structural member being coupled to opposite ends of a bias member biasing the at least two structural members to move towards or away from each other, wherein one or more of the at least two structural members form a bias member receiving recess and the structural members and bias member are coupled together in such a manner that moving one structural member relative to the other structural member causes the bias member to rotate at least partially into or at least partially out of the bias member receiving cavity. Such an embodiment may in some instances also be characterized as satisfying and/or including one or more of the following: (a) one of the at least two structural members is a container including a cavity and an opening providing access into the cavity from the exterior of the container, a second of the at least two structural members is a cover pivotably coupled to the container in such a manner that the cover can be pivoted between an open position and a closed position wherein the cover blocks substantially more of the opening when in the closed position than in the open position, the bias member is has a length substantially greater than its width or diameter, and opening the cover by pivoting it towards the open position causes the bias member to rotate about a point at or near a container end of the bias member, and in so doing to rotate at least partially out of a bias member receiving recess, and closing the cover by pivoting it towards the closed position causes the bias member to rotate about the same point at or near the end of the bias member and in so doing to rotate at least partially into the bias member receiving recess; (b) the container end of the bias member is anchored within the bias member receiving recess by an elongated member about which the bias member rotates when rotating into or out of the bias member receiving recess; (c) the bias member is a spring biasing the cover towards the closed position, and opening the cover causes the spring to stretch and form a first leg of a triangle with a portion of the container forming a second leg, and a portion of the cover forming a third leg of the triangle; (d) the container is a recreation vehicle trailer. the cavity is sized and dimensioned to contain at least on recreation vehicle; the opening is sized and dimensioned to allow a recreation vehicle to be moved into and out of the cavity; and the cover is a vehicle ramp adapted to prevent access to the cavity via the opening when in the closed position, to allow access to the cavity via the opening when in the open position, and to provide a mechanism for supporting a recreation vehicle being moved into or out of the cavity by acting as an inclined plane; and (e) the assembly comprises at least two springs positioned on opposite sides of the vehicle ramp, and opening and closing the trailer by pivoting the vehicle ramp causes each of the at least two springs to rotate at least partially into or out of at least two spring receiving recesses.

The invention claimed is:

1. A recreation vehicle comprising a door ramp, a body, and a spring with the spring extending between the door ramp and the body and the door ramp coupled to the body in such a manner that the door ramp can be swung between at least an open position where the door extends between the body and a surface supporting the vehicle and a closed position where it does not so extend, wherein:

the body comprises a spring receiving recess that the spring is positioned substantially within when the door ramp is closed.

2. The vehicle of claim 1 wherein opening the door ramp causes the spring to stretch and to rotate at least partially out of the spring receiving recess.

3. The vehicle of claim 2 wherein the spring is rotatably coupled to the body by a pin that extends between two sidewalls of the spring receiving recess, and the spring is coupled to the pin in such a manner that it can slide along the pin.

4. The vehicle of claim 3 wherein swinging the door ramp close causes the door ramp to compress an elastomeric seal positioned adjacent to one of the two sidewalls of the spring receiving recess.

5. The vehicle of claim 4 wherein the spring is coupled to the door ramp by a bracket that is positioned within the spring receiving recess when the door ramp is closed.

6. The vehicle of claim 5 wherein the recess comprises a top wall and a back wall wherein the top wall and back wall are substantially perpendicular to each other and both the top wall and back wall are positioned with X inches of the pin where X is one of 4, 3, 2, 1, and 0.5.

7. The vehicle of claim 6 wherein the vehicle comprises at least a second spring and at least a second spring receiving recess.

8. A recreation vehicle door ramp spring arrangement comprising a trailer including:

a floor, a ceiling, and two sides surrounding a cavity sized and dimensioned to hold at least one recreation vehicle;

an opening extending from an exterior of the trailer into the cavity with the opening sized and dimensioned such that a recreation vehicle can enter the cavity through the opening;

a door ramp structured and coupled to the trailer in such a manner that the door ramp is pivotable between an open position and a closed position wherein the door ramp blocks more of the opening when in the closed position than when in the open position and can support at least a vehicle as it is being moved into the trailer while in the open position;

at least a first spring and a second spring positioned on opposite sides of the opening and extending between the sides of the opening and the door ramp; and at least a first spring recess and a second spring recess with the first spring removeably coupled to the side of the opening via a first spring pin extending between two opposite sides of the first spring recess and the second spring removeably coupled to the side of the opening via a second spring pin extending between two opposite sides of the second spring recess; wherein pivoting the door ramp into the open position causes the first spring to stretch and to rotate at least partially out of the first spring recess and causes the second spring to stretch and rotate at least partially out of the second spring recess;

pivoting the door ramp into the closed position causes the first spring to rotate at least partially into the first spring recess and causes the second spring to rotate at least partially into the second spring recess; and pivoting the door ramp into the closed position causes the door ramp to compress at least two elastomeric seals where a first seal is positioned adjacent to the first spring recess and a second seal is positioned adjacent to the second spring recess and the first and second seals, when compressed between the door ramp and the trailer each form a barrier inhibiting material from passing between the first and second spring recesses and the trailer cavity through the opening.

9. An assembly comprising at least two structural members moveably coupled to each other, each structural member being coupled to opposite ends of a bias member biasing the at least two structural members to move towards or away from each other, wherein one or more of the at least two structural members form a bias member receiving recess and the structural members and bias member are coupled together in such a manner that moving one structural member relative to the other structural member causes the bias member to rotate at least partially into or at least partially out of the bias member receiving cavity.

10. The assembly of claim 9 wherein:
one of the at least two structural members is a container including a cavity and an opening providing access into the cavity from the exterior of the container;
a second of the at least two structural members is a cover pivotably coupled to the container in such a manner that the cover can be pivoted between an open position and a closed position wherein the cover blocks substantially more of the opening when in the closed position than in the open position;
the bias member has a length substantially greater than its width or diameter,
wherein opening the cover by pivoting it towards the open position causes the bias member to rotate about a point at or near a container end of the bias member, and in so doing to rotate at least partially out of a bias member receiving recess, and closing the cover by pivoting it towards the closed position causes the bias member to rotate about the same point at or near the end of the bias member and in so doing to rotate at least partially into the bias member receiving recess.

11. The assembly of claim 10 wherein the container end of the bias member is anchored within the bias member receiving recess by an elongated member about which the bias member rotates when rotating into or out of the bias member receiving recess.

12. The assembly of claim 11 wherein the bias member is a spring biasing the cover towards the closed position, and opening the cover causes the spring to stretch and form a first leg of a triangle with a portion of the container forming a second leg, and a portion of the cover forming a third leg of the triangle.

13. The assembly of claim 12 wherein the container is a recreation vehicle trailer the cavity is sized and dimensioned to contain at least one recreation vehicle, the opening is sized and dimensioned to allow a recreation vehicle to be moved into and out of the cavity, and the cover is a vehicle ramp adapted to prevent access to the cavity via the opening when in the closed position, to allow access to the cavity via the opening when in the open position, and to provide a mechanism for supporting a recreation vehicle being moved into or out of the cavity by acting as an inclined plane.

14. The assembly of claim 13 wherein the assembly comprises at least two springs positioned on opposite sides of the vehicle ramp, and opening and closing the trailer by pivoting the vehicle ramp causes each of the at least two springs to rotate at least partially into or out of at least two spring receiving recesses.

* * * * *